United States Patent
Zhao et al.

(10) Patent No.: US 7,912,115 B2
(45) Date of Patent: Mar. 22, 2011

(54) METHOD AND SYSTEM FOR PROCESSING REFERENCE SIGNALS IN OFDM SYSTEMS USING TRANSMISSION TIME INTERVAL GROUPINGS

(75) Inventors: Shengjie Zhao, Mundelein, IL (US);
Hanqing Lou, Garland, TX (US);
Neelesh B. Mehta, Secunderabad (IN);
Jinyun Zhang, Cambridge, MA (US)

(73) Assignee: Mitsubishi Electric Research Laboratories, Inc, Cambridge, MA (US)

( * ) Notice: Subject to any disclaimer, the term of this patent is extended or adjusted under 35 U.S.C. 154(b) by 305 days.

(21) Appl. No.: 12/297,064

(22) PCT Filed: Apr. 28, 2006

(86) PCT No.: PCT/US2006/016290
§ 371 (c)(1),
(2), (4) Date: Oct. 14, 2008

(87) PCT Pub. No.: WO2007/130011
PCT Pub. Date: Nov. 15, 2007

(65) Prior Publication Data
US 2009/0268695 A1      Oct. 29, 2009

(51) Int. Cl.
*H04L 5/16* (2006.01)
(52) U.S. Cl. ......................................... 375/219; 375/260
(58) Field of Classification Search .......... 375/219–220, 375/260, 356, 358; 370/336
See application file for complete search history.

(56) References Cited

U.S. PATENT DOCUMENTS
6,747,966 B1 *   6/2004   Ahmavaara ................... 370/337
* cited by examiner

*Primary Examiner* — Emmanuel Bayard
(74) *Attorney, Agent, or Firm* — Dirk Brinkman; Gene Vinokur

(57) ABSTRACT

A method and system processes reference signals (115) for an uplink channel (103) between a transmitter, such as user equipment, and a receiver such as a base station, in a wireless communication network. A sequence of symbols to be transmitted is converted to a sequence of sub frames. The sequence of sub frames is grouped into groups of sub frames. Each sub frames includes at least two time-adjacent sub frames, and reference signals are inserted in a subset of the sub frames.

46 Claims, 13 Drawing Sheets

METHOD AND SYSTEM FOR PROCESSING REFERENCE SIGNALS IN OFDM SYSTEMS USING TRANSMISSION TIME INTERVAL GROUPINGS

FIELD OF INVENTION

This invention relates generally to orthogonal frequency-division multiplexing (OFDM) wireless communication systems, and more particularly processing reference signals in OFDM systems.

BACKGROUND OF THE INVENTION

In some wireless communication systems, multiple mobile transceivers, also known as 'user equipment' (UE), e.g., cellular telephones, communicate simultaneously with stationary transceivers, e.g., base stations. In such communications systems, reference signals are necessary for coherent demodulation of RF signals and detection of data at the receiver. The reference signals are also used to estimate a quality of uplink channels from the mobile transmitters to the receiver for channel-dependent frequency-scheduling and/or time-domain scheduling.

Allocating more resources, such as power, time and frequency for the reference signals improves channel state information (CSI) estimation, and thus, leads to better demodulation of the data with a reduced bit error rate (BER). However, increasing the resources for the reference signals reduces the spectral efficiency of the system.

In such systems, a sub-frame is a basic unit of transmission. The sub-frame includes short blocks and long blocks. The short blocks can include the reference signals. The long blocks do not include reference signals. In 3GPP, the sub-frame corresponds to a transmission time interval (TTI). That is, the entire sub-frame is transmitted during one continuous, uninterrupted time interval. In the art and herein, the terms 'TTI' and 'sub-frame' are used interchangeably.

In the prior art, each TTI includes an equal number of reference signals so that the receiver can estimate the CSI before the data in the TTI are demodulated and detected.

In 3GPP LTE, two reference signal patterns are currently being considered. With frequency division multiplexing (FDM), each UE sends its uplink reference signal across a distinct set of sub-carriers, R1-060246, "EUTRA SC-FDMA Uplink Resource Block, Resource Allocation and Pilot/Reference Signal Design & TP," Motorola; incorporated herein by reference. The reference signals of any two UEs are orthogonal to each other and do not overlap in the frequency-domain.

With code division multiplexing (CDM), each UE sends its uplink reference signal across a common set of sub-carriers, R1-060784, "Orthogonal Pilot Channel Structure for E-UTRA Uplink," NTT DoCoMo, Fujitsu, Mitsubishi Electric, NEC, Panasonic, Sharp; incorporated herein by reference. Orthogonality between the reference signals of two UEs is achieved in the 'code-domain' by ensuring that the UEs transmit sequences across time and frequency that are orthogonal to each other. For example, the reference signals are generated by taking cyclic shifts of a single constant amplitude zero auto-correlation (CAZAC) sequence. Examples of CAZAC sequences are given in B. M. Popovic, "Generalized Chirp-like Polyphase Sequences with Optimal Correlation Properties," IEEE Trans. Info. Theory, vol. 38, pp. 1406-1409, July 1992; and D. C. Chu, "Polyphase codes with good periodic correlation properties," IEEE Trans. Inform. Theory, vol. IT18, pp. 531-532, 1972; both incorporated herein by reference.

In general, the overhead associated with the uplink reference signals is considerable as the reference signals are required to enable the receiver to estimate the channel quality of all the UEs that intend to communicate with it, and to aid the receiver station to coherently demodulate the data from the signals received from the respective transmitting UEs. Generating the reference signals consumes power and takes time. Transmitting the reference signals consumes power. Estimating the CSI from the received reference signals consumes power and takes time. The reference signals consume precious bandwidth and valuable space in the sub-frames that could otherwise be used by data and control signals.

Therefore, it is desired to reduce the overhead associated with the reference signals used for coherent signal demodulation and data detection on uplinks from transmitters to a receiver so that the number of UEs that transmit signals simultaneously can be increased.

SUMMARY OF THE INVENTION

The embodiments of the invention provide a method and system for processing reference signals based on groups of sub-frames, also known as transmission time intervals (TTIs). In a transmitter, sequential sub-frames are grouped into groups including at least two or more sub-frames.

Reference signals are only inserted in a subset of the sub-frames in each group. That is, in contrast with the prior art, some sub-frames do not include reference signals. Alternatively expressed, the reference signals in some sub-frames have reduced power, spectrum, time, or space resources, or none at all. Thus, the space, time, spectrum and power that were used for reference signals in the prior art can now be put to good use to decrease overhead and increase the efficiency of the system.

In a receiver, the channel state information (CSI) for sub-frames lacking reference signals in a particular group is either interpolated or predicted from sub-frames in the group that do include reference signals.

The various embodiments are applicable to frequency division multiplexing (FDM) reference signals, code division multiplexing (CDM) reference signals, and hybrid FDM/CDM reference signals.

The sub-frame grouping patterns according to embodiments of the invention are also suitable for a 'variable TTI' feature being considered in 3GPP LTE. In a variable TTI enabled system, the sub-frame duration is variable and is an integral multiple of a minimum duration of 0.5 ms.

The embodiments of the invention can be extended to any OFDM-based wireless communication systems, including MIMO systems.

In another embodiment of the invention, the base station (receiver) signals the transmitter (UE) which sub-frame grouping pattern to use.

DETAILED DESCRIPTION OF THE INVENTION

The embodiments of our invention provide a system and method for processing reference signals in a multi-user wireless communication system. The reference signals are processed so as to reduce overhead associated with generating, transmitting, and receiving reference signals.

System Overview

Figure 1A:
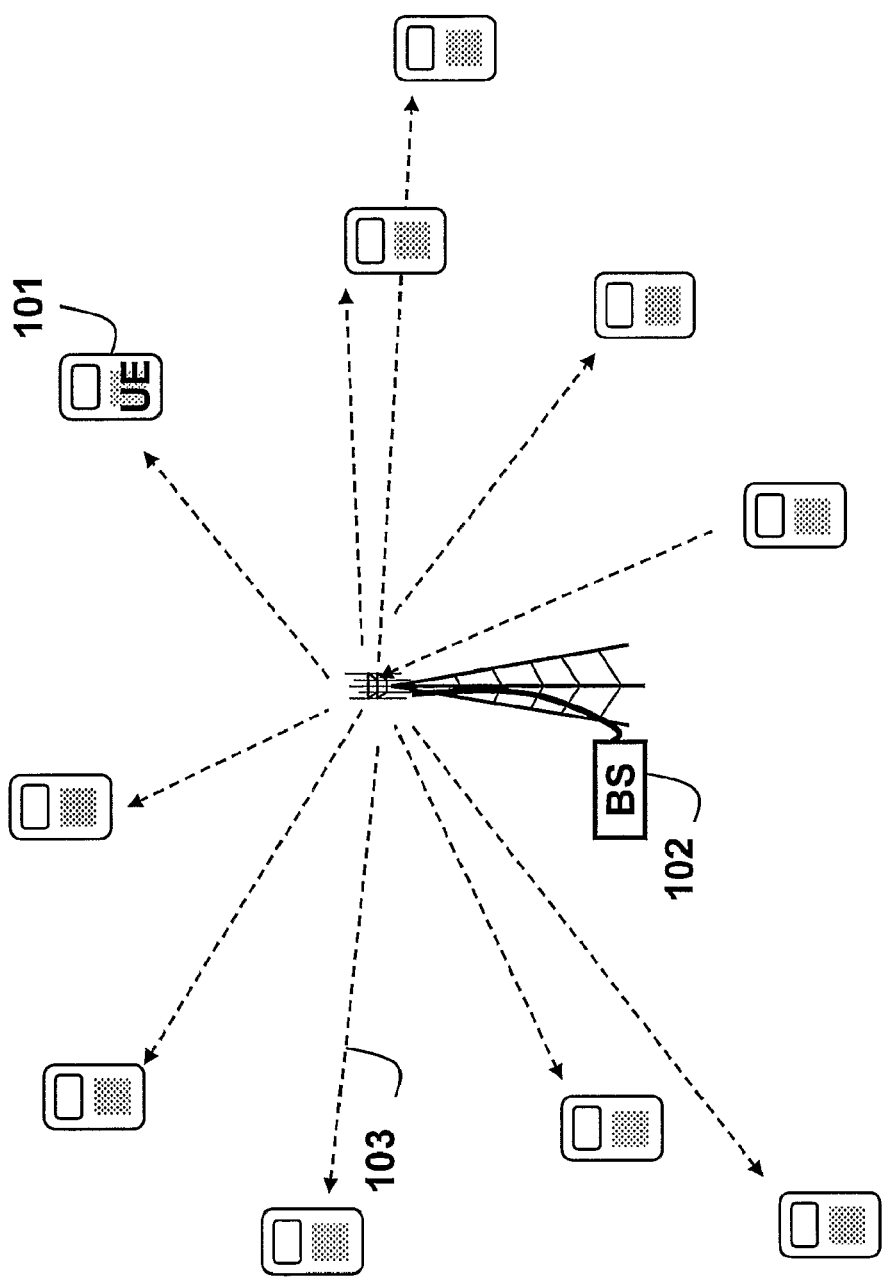
FIG. 1A is a block diagram of a communications system according to an embodiment of the invention.

FIG. 1A shows a multi-user, wireless communication system according to an embodiment of the invention. The system includes multiple mobile transceivers 101, also known as 'user equipment' (UE), e.g., cellular telephones. Typically, the UEs communicate simultaneously with a stationary transceiver 102, e.g., a base station (BS), via channels 103. Because the UE can be mobile, states of the channels 103 change over time.

Therefore, in such communications systems, reference signals are used to estimate channel state information (CSI) for the time-varying channels 103 so that the RF signals can be demodulated coherently and data can be detected at the base station 102.

Transmitter

Figure 1B:
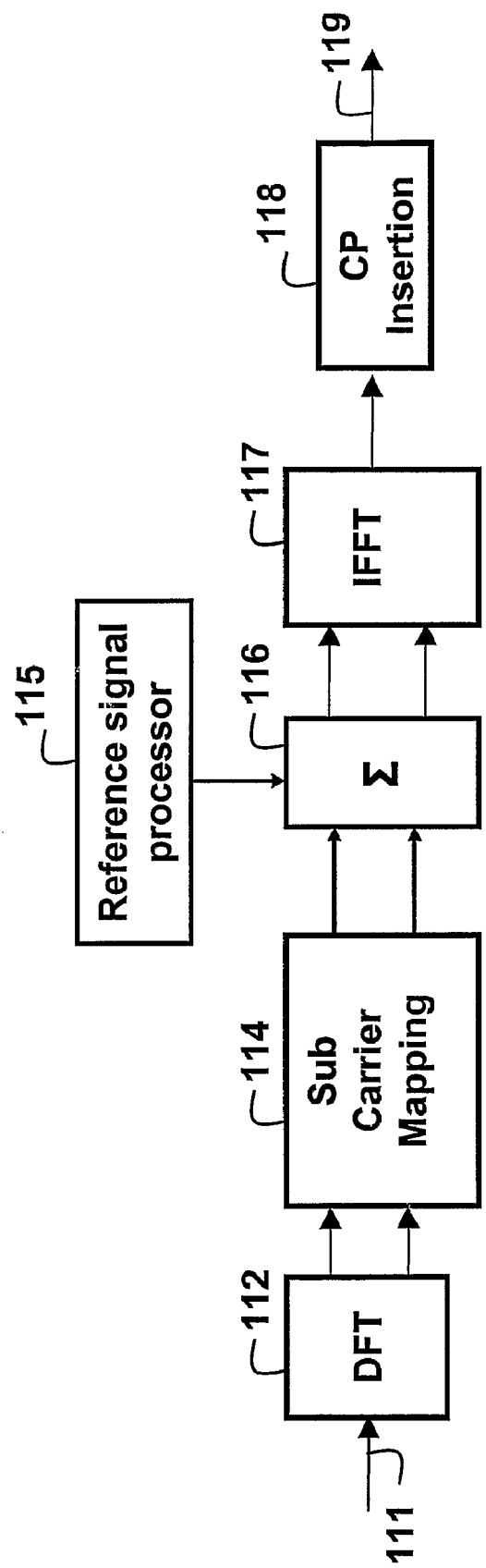
FIG. 1B is a block diagram of a transmitter that can use the embodiments of the invention.
Figure 1C:
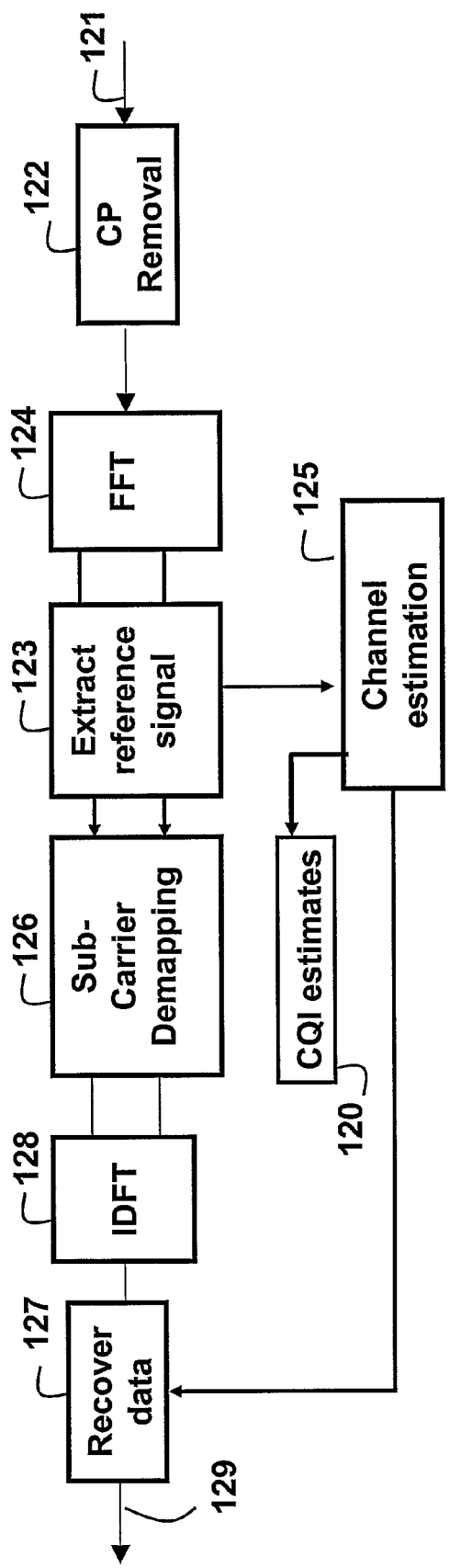
FIG. 1C is a block diagram of a receiver that can use the embodiments of the invention.

FIG. 1B shows a portion of a transmitter of the UE 101 that can use the embodiments of our invention. The transmitter can transmit and receive RF signals with a single antenna or multiple antennas. The RF signals are modulated using single carrier, frequency division multiple access (SC-FDMA) with cyclic prefixes. The signals are transmitted to the receiver via the uplink channel 103 in the network designed according to the $3^{rd}$ generation partnership project (3GPP), long term evolution (LTE). SC-FDMA achieves uplink inter-user orthogonality, and enables efficient frequency-domain equalization at the receiver.

An input signal 111 includes $N_{TX}$ symbols to be transmitted. A discrete Fourier transform (DFT) 112 converts the input signal to a frequency domain. This enables a relatively high degree of commonality with a downlink OFDM transmission scheme, e.g., the same clock frequency can be used. The SC-FDMA signal has a low power derating, meaning a lower peak to average power ratio (PAPR) or a lower cubic metric (CM), which enables the use of power efficient power amplifiers in the transmitter.

Next, sub-carrier mapping 114 is applied. The reference signals are inserted 116 by a reference signal processor 115, which can generate different reference signals for different TTIs for the same UE. According to one embodiment of the invention, reference signals are inserted in a subset of the TTIs.

This is followed by an inverse Fourier transform (IFFT) 117. Cyclic prefixes are inserted 118 before the output signal 119 is transmitted on the uplink channel 103 to the receiver 102.

Receiver

An input signal 121 to the receiver is the baseband signal obtained after low noise amplification, down-conversion, and analog to digital conversion. After CP removal 122, a FFT is applied 124. The signal received in the time-frequency locations that were used for reference signals is extracted 123 for channel estimation 125. This is followed by sub-carrier demapping 126, an inverse discrete Fourier transform (IDFT) 128, and de-interleaving, FEC decoding, and demodulation/detection to recover 127 data 129.

The channel estimation 125 can be done using signals received over multiple TTIs. Channel quality indicator (CQI) estimates 120, which are transmitted to the base station to aid uplink scheduling that exploits channel variations, are also generated. The recovered data 129 may also be used for channel estimation and generation of CQI estimates.

Base Station

Figure 1D:
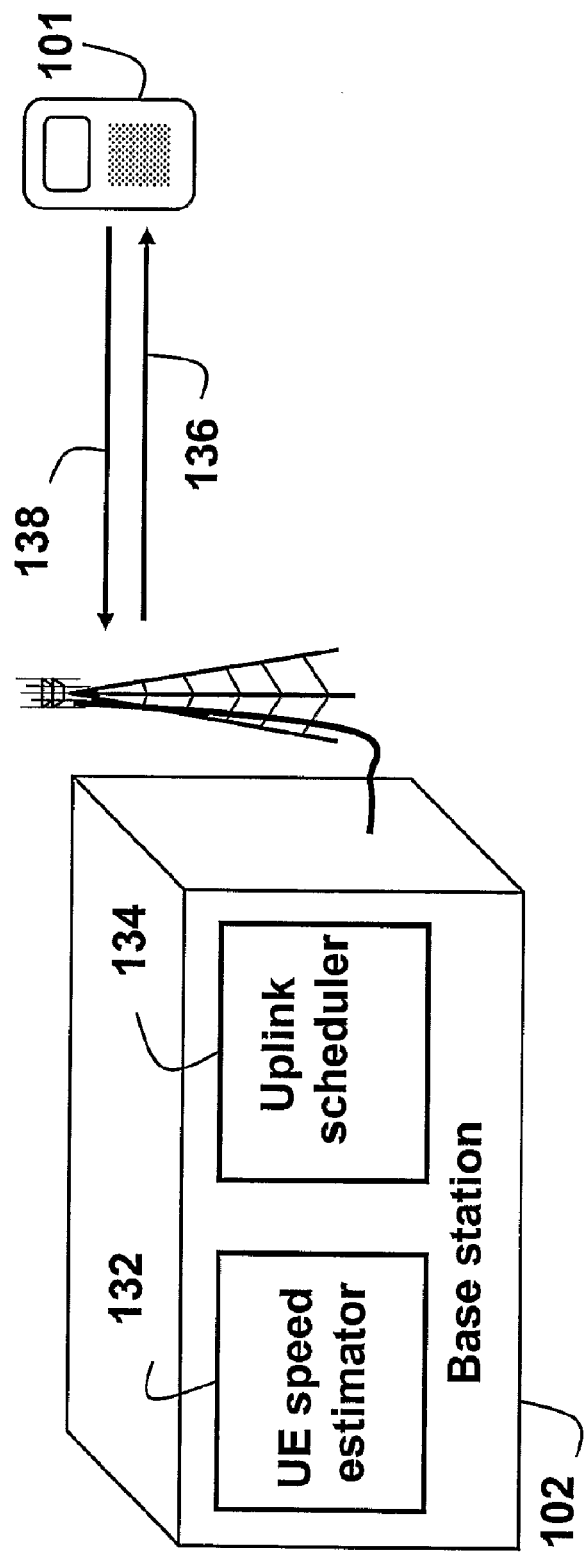
FIG. 1D is a block diagram of a base station and signaling between the base station and UE.

FIG. 1D shows some details of the base station (receiver) 102 according to an embodiment of the invention. The base station includes a UE speed estimator 132 and an uplink scheduler 134. The base station can transmit a reference signal grouping pattern index 136 to the UE 101, and receive signals 138 from the UE 101 that use specified reference signal grouping patterns, as described below in greater detail.

Sub-Frame

Figure 2:
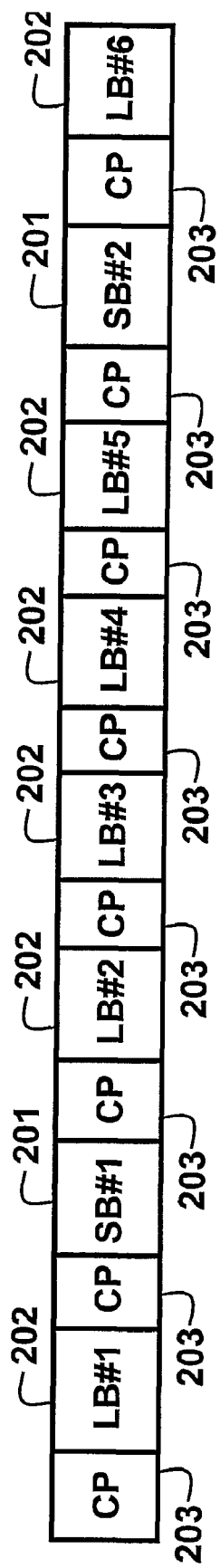
FIG. 2 is a block diagram of a sub-frame structure that can use the embodiments of the invention.

FIG. 2 shows a general structure of a sub-frame according to an embodiment of the invention. The sub-frame (TTI) is the basic unit of transmission. The sub-frame includes a total of eight blocks: two short blocks (SB) 201 and six long blocks (LB) 202. The blocks are separated by 4.04 µs cyclic prefixes (CP) 203. The short blocks are the second and seventh blocks. The short blocks can be used for the reference signals, and control information and data transmission. The long blocks only include control information and data, and do not contain reference signals. In 3GPP, the sub-frame corresponds to a transmission time interval (TTI). That is, the entire sub-frame is transmitted during one continuous, uninterrupted time interval.

TTI Grouping

If the mobile UE 101 travels at a speed of 30 km/h and transmits at a carrier frequency of 2.0 GHz, then a maximum Doppler spread is $D_S=110$ Hz. Thus, a coherent time of the channel is $T_C=1/(4D_S)=2.3$ ms. If each TTI (sub-frame) has a duration of 0.5 ms, then the channel coherent time is approximately equal to 4.5 sub-frames. Thus, multiple consecutive TTIs are subject to the same channel state. Therefore, in general, the number of TTIs in a group is inversely proportional to the speed of the UE. The smaller the speed of the UE, the larger the groups. It is noted, that a size of the group can be varied dynamically with the speed of the UE.

Therefore, the embodiments of our invention rely on the relatively long channel coherence to reduce the amount of overhead associated with processing reference signals.

According to the embodiments of the invention, the UE transmits reference signals that use different amounts of resources in a group of consecutive TTIs. The resources can include frequency density in the case of FDM, and power in the case of CDM. This does not affect performance at the receiver 102. The receiver 102 can use a combination of techniques based on channel prediction and interpolation to estimate the channel for all the TTIs in the group.

The specific resource allocation over multiple sub-frames to be used by the UE when the UE transmits its signal is signaled by the base station. This can be done using the conventional paging and access grant channel (PAGCH), the dedicated control channel (DCH), or common control channel (CCH), and their equivalent versions that are used in 3GPP LTE.

The way that the TTIs can be grouped can be different. The groupings depend, in part, on the speed of the UE, and different numbers of TTI can be grouped. Particular groupings are determined according to the reference signal grouping pattern indices 136 signaled by the base station 102.

Table A lists the maximum Doppler frequency and the channel coherence time for various UE velocities.

TABLE A

| UE speed (km/h) | Max. Doppler Frequency (Hz) | Coherence time in ms | Coherence time in TTIs |
|---|---|---|---|
| ~0 | ~0 | very long | many |
| 3 | 5.5 | 22.7 | 45.4 |
| 30 | 55 | 2.3 | 4.5 |
| 120 | 220 | 0.57 | 1.14 |
| 350 | 648 | 0.19 | 0.38 |

As shown in Table A, the relatively large coherence times, particularly for a very slow moving EU, implies that channel state information (CSI) estimation and interpolation/prediction techniques can be used by the receiver to estimate the CSI of a TTI of interest from that of time adjacent TTIs. Thus, the embodiments of the invention estimate the CSI, not for every individual TTI, as in the prior art, but for a group of TTIs. This greatly reduces the amount of resources required.

For our embodiments of the invention, we describe two TTI grouping schemes: interpolation-based TTI groupings and prediction-based TTI groupings, as shown in FIGS. 3-9. FIG. 10 shows a prior art reference signal. In the prior art, each TTI includes an equal number of reference signals.

In these figures, the horizontal axis is time (t), and the vertical axis is frequency (f) or sub-carriers. The time adjacent sub-frames are labeled TTI 1, TTI 2, and so forth. The TTIs and short blocks that include reference signals are indicated with cross-hashing, e.g., SB 1 and SB 2 in TTI 1 and TTI 3, see FIG. 3. The symbols 'ω' are coefficients used by the interpolation or prediction, i.e., the curved arrows in the figures.

As can be seen in the figures, all blocks in time adjacent TTIs are transmitted sequentially, one after the other. In addition, different blocks can also be transmitted at different sub-carriers over blocks of sub-carriers, which are contiguous or distributed in frequency, called resource blocks. For example, a resource block includes 24 sub-carriers. The total number of resource blocks depends on the bandwidth of operation of the system and the number of sub-carriers per resource block. A subset of the resource blocks is allocated to the UE. It is possible for the uplink scheduler to allocate different resource blocks, separated in frequency, to different UEs at the same.

The embodiments of the invention can be utilized for both localized and distributed data structures in uplink transmission, as described in 3GPP TR 25.814 "Physical Layer Aspects for Evolved UTRA," V1.2.2 (2006-3), incorporated herein by reference.

Reference Signal Overhead Reduction

The reference signal overhead ratio ($\Lambda$) for one TTI is $$\Lambda = \frac{N_p}{N}, \quad (1)$$

where $N_p$ is the number of sub-carriers for the reference signal, and N is number of sub-carriers used in one TTI.

With TTI grouping, as described herein, the reference signal overhead ratio is reduced to $$\Lambda' = \frac{M_p}{M}, \quad (2)$$

where $M_p$ is a number of reference signals in a group of TTIs, and M is a number of sub-carriers used in the TTI group.

Interpolation-Based TTI Grouping

For interpolation-based groupings, we describe grouping three time adjacent TTIs and grouping four time adjacent TTIs. It should be noted that other groupings can be used, particularly if the UE is moving slowly, or not at all.

Figure 3:
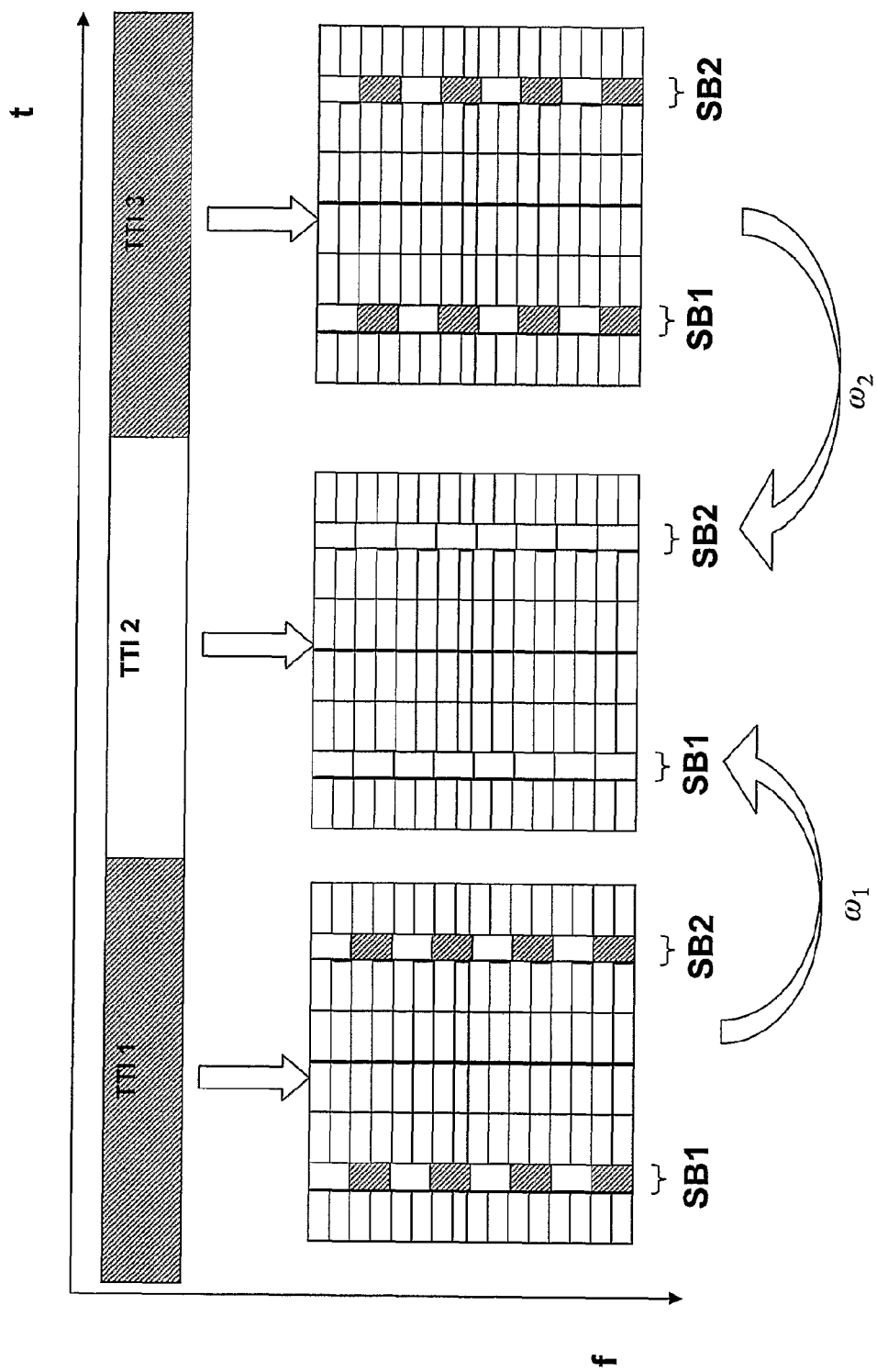
FIG. 3 is a block diagram of a TTI grouping [1 0 1] for interpolation-based reference signal processing according to an embodiment of the invention.

As shown in FIG. 3, we consider three time adjacent TTIs as one group. In TTI 1 and TTI 3, the reference signals are inserted for channel estimation in the short blocks SB1 and SB2. In TTI 2, no reference signal is inserted in the short blocks. The channel state information (CSI) estimates, $\hat{H}_1$ and $\hat{H}_3$, of TTI 1 and TTI 3 are determined by using their respective reference signals. The CSI for TTI 2 can be obtained by interpolating the CSIs of TTI 1 and TTI 3 according to $$\hat{H}_2 = \omega_1 \hat{H}_1 + \omega_2 \hat{H}_3,$$

where interpolation coefficients $\omega_1$ and $\omega_2$ are determined using conventional, well known linear filter theory.

As stated above, the channel coherence time is about the duration of 4.5 TTIs for a UE traveling at a speed of 30 km/h. Therefore, the channel interpolation is accurate. In general, the interpolated CSI $\hat{H}_2$ is a non-linear function of the estimated CSIs $\hat{H}_1$ and $\hat{H}_3$. Other techniques, such as maximum likelihood estimation or maximum a posteriori estimation, can also be used to determine the CSI $\hat{H}_2$.

We call this a [1 0 1] TTI grouping pattern, where '1' indicates that the corresponding TTI includes reference signals, and '0' indicates that the corresponding TTI does not include reference signals.

From Equation (2), the reference signal overhead ratio for this TTI grouping scheme is $$\Lambda' = \frac{2}{3} \Lambda,$$

which is 33% less overhead than the overhead for a conventional reference signal.

Figure 4:
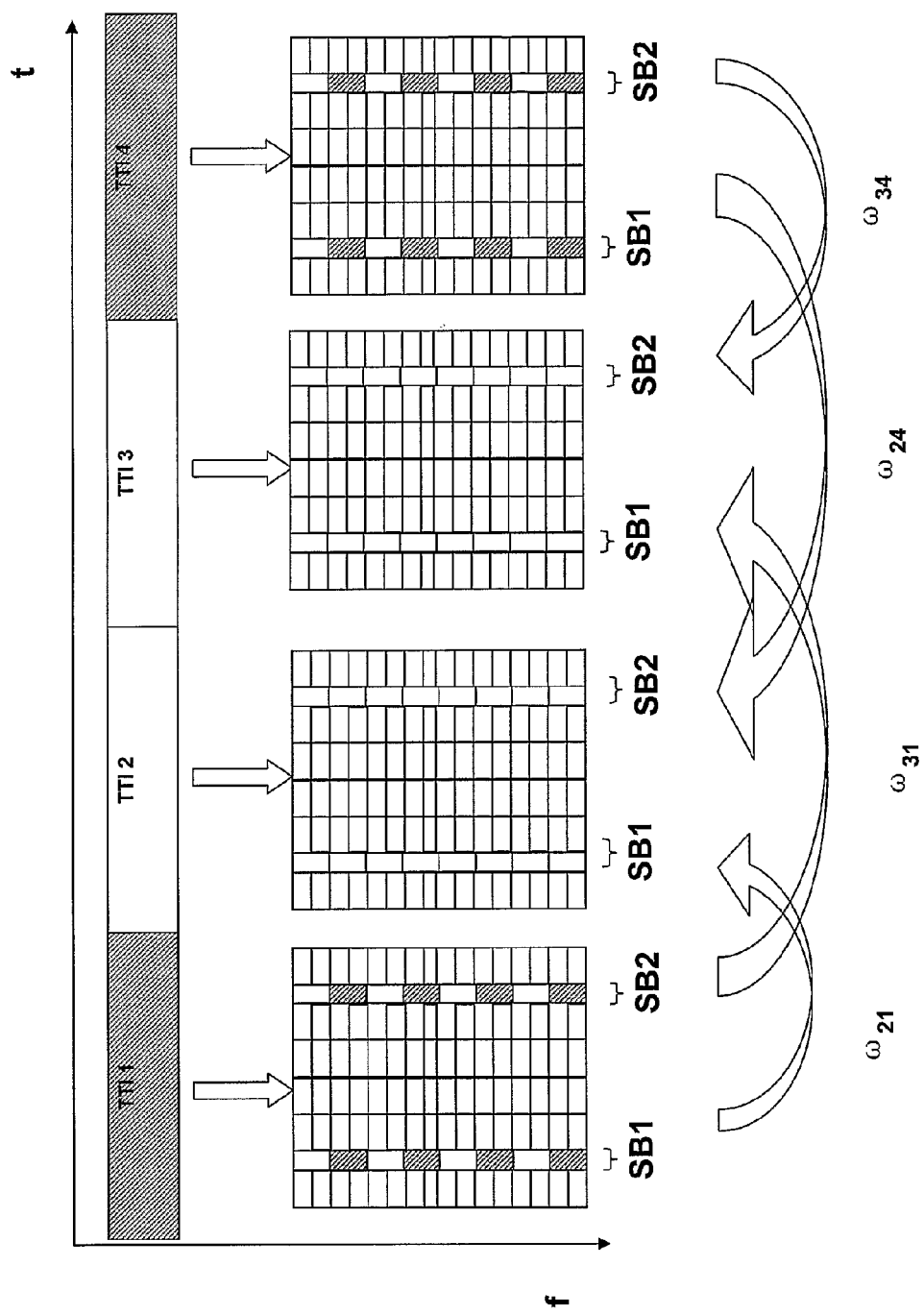
FIG. 4 is a block diagram for a TTI grouping [1 0 0 1] for interpolation-based reference signal processing according to an embodiment of the invention.

As shown in FIG. 4, we consider four time adjacent TTIs as one group. The reference signals are inserted for channel estimation in TTI 1 and TTI 4. No reference signal is inserted in TTI 2 and TTI 3. The CSIs $\hat{H}_1$ and $\hat{H}_4$ of TTI 1 and TTI 4, respectively, can be estimated from the reference signals in TTI 1 and TTI 4, respectively. Then, the reference signals in TTI 1 and TTI 4 can be interpolated to obtain accurate CSIs $\hat{H}_2$ and $\hat{H}_3$ for TTI 2 and TTI 3, respectively, as follows:

$$\hat{H}_2 = \omega_{21}\hat{H}_1 + \omega_{24}\hat{H}_4$$

$$\hat{H}_3 = \omega_{31}\hat{H}_1 + \omega_{34}\hat{H}_4.$$

The coefficients $\omega_{21}$, $\omega_{24}$, $\omega_{31}$, and $\omega_{34}$ can be determined using linear filter theory, relying on second order statistics of the channel. We call this TTI grouping pattern [1 0 0 1].

From Equation (2), the reference signal overhead ratio is now $$\Lambda' = \frac{2}{4}\Lambda.$$

Thus, the pattern [1 0 0 1] reduces the overhead of the uplink reference signal by 50% compared with the prior art.

The above described technique works when staggered reference signals are used for the two short blocks. In the staggered reference signals, different sub-carriers in the SB1 and the SB2 carry the reference signals.

The above described technique also works when only one of the short blocks is used for reference signals in each TTI.

The interpolation-based TTI grouping technique introduces some delay during decoding. For example, in the [1 0 1] scheme, the data in TTI 2 can be demodulated and decoded only after the CSI for TTI 3 has been obtained. Similarly, with the [1 0 0 1] TTI grouping scheme, the data in TTI 2 and TTI 3 can be decoded only after the CSI of TTI 4 is obtained.

Prediction-Based TTI Grouping

To overcome the delay problem of the interpolation-based TTI grouping described above, we also describe the prediction-based TTI grouping. Compared with the interpolation-based TTI grouping, the prediction-based TTI grouping reduces the overhead associated with the reference signal with, perhaps, less accurate channel estimation.

Figure 5:
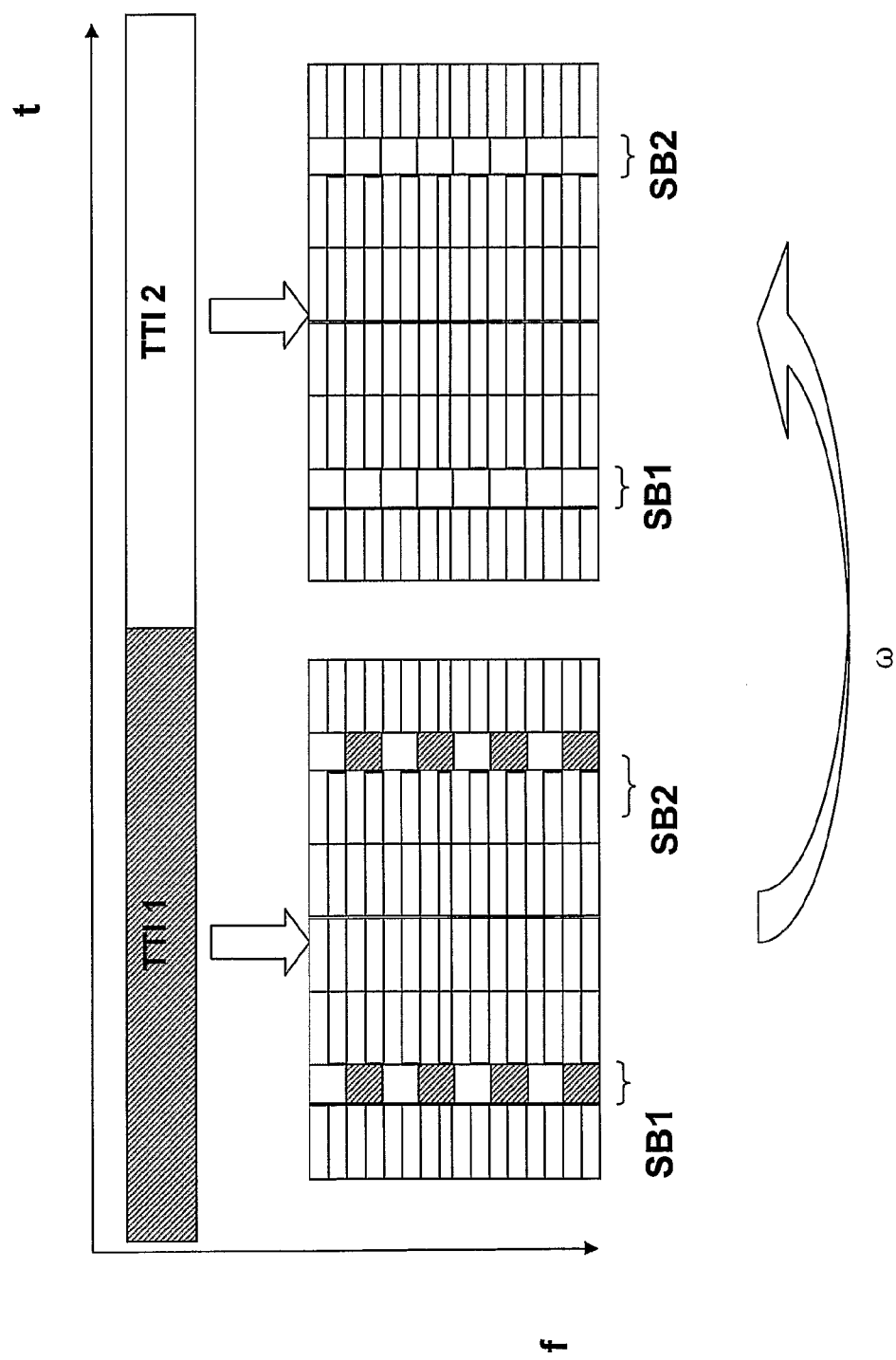
FIG. 5 is a block diagram of a TTI grouping [1 0] for prediction-based reference signal processing according to an embodiment of the invention.

As shown in FIG. 5, two time adjacent TTIs are considered as one group. The reference signals in TTI 1 are inserted for channel estimation. However, no reference signals are inserted in TTI 2. The CSI estimate, $\hat{H}_1$, of TTI 1 can be determined from the reference signals of TTI 1. The CSI estimate of TTI 2 can be predicted from the CSI estimate of TTI 1, using, for example, $\hat{H}_2 = \omega \hat{H}_1$, where $\omega$ is a prediction coefficient determined from, for example, linear filter theory that relies on second order statistics of the channel. We call this pattern [1 0].

From Equation (2), the reference signal overhead ratio is $$\Lambda' = \frac{1}{2}\Lambda,$$

which is a 50% reduction in the uplink reference signal overhead per UE compared with the prior art.

Figure 6:
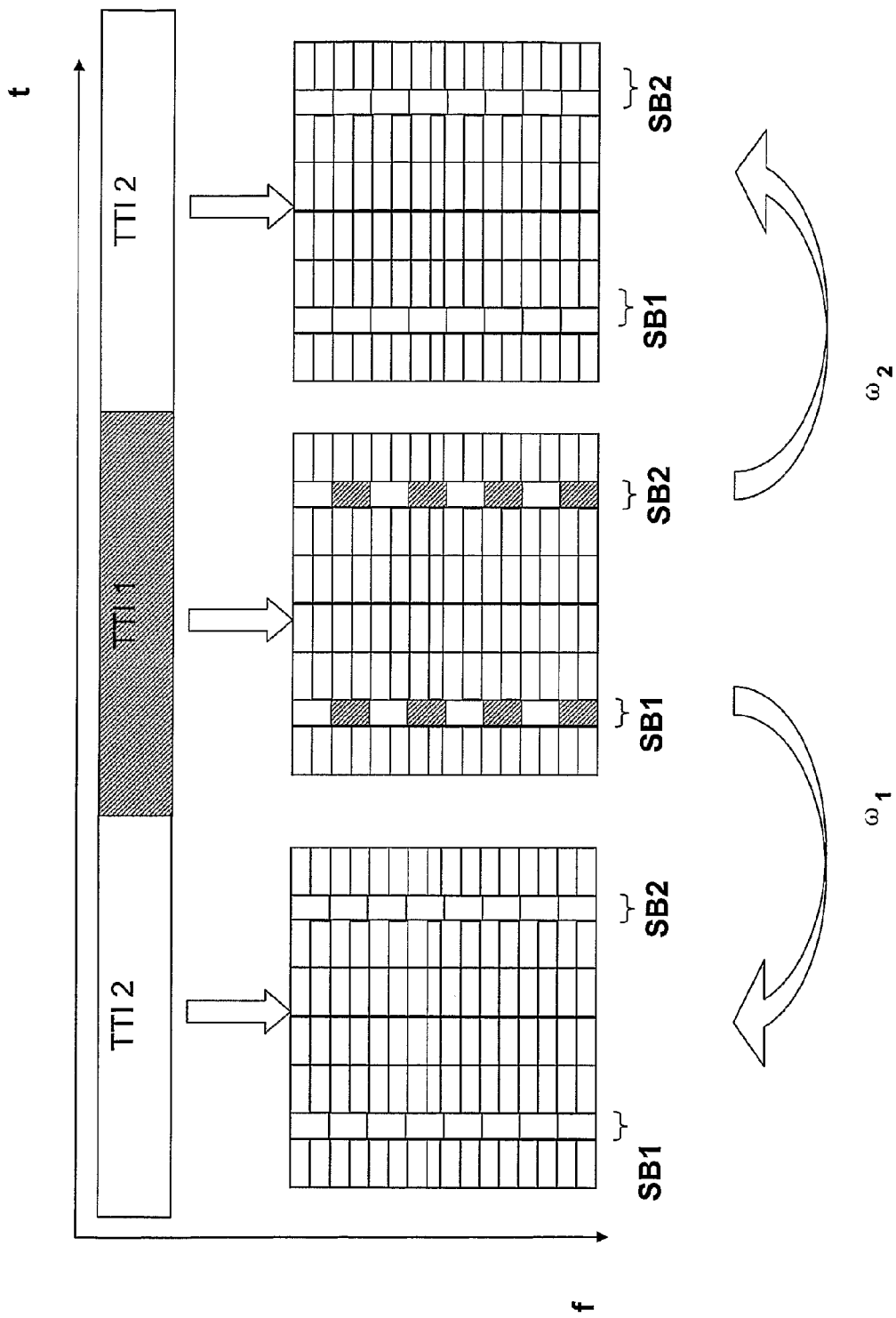
FIG. 6 is a block diagram for a TTI grouping [0 1 0] for prediction-based reference signal processing according to an embodiment of the invention.

FIG. 6 shows three time adjacent TTIs as one group. The corresponding reference signals are inserted in TTI 2 for channel estimation. However, no reference signals are inserted in TTI 1 and TTI 3. The CSI estimate, $\hat{H}_2$, of TTI 2 can be determined from the reference signals in TTI 2. Then, forward and backward prediction can be used to estimate the CSI for TTI 1 and TTI 3. The CSI estimates of TTI 1 and TTI 3 are determined by the backward prediction, $\hat{H}_1 = \omega_1 \hat{H}_2$, and the forward prediction, $\hat{H}_3 = \omega_2 \hat{H}_2$, respectively. We call this the [0 1 0] TTI grouping pattern.

According to Equation (2), the overhead of the reference signal ratio is $$\Lambda' = \frac{1}{3}\Lambda,$$

which is a 66% reduction in the overhead of the uplink reference signal UE compared with the prior art.

The TTI grouping patterns as described herein lead to a minimal performance degradation in system throughput and BER, particularly for slow moving UE. The method can be adopted in OFDM-based wireless communication systems such as 3GPP LTE, WiMAX (802.16), and Wi-Fi (802.11).

Figure 7:
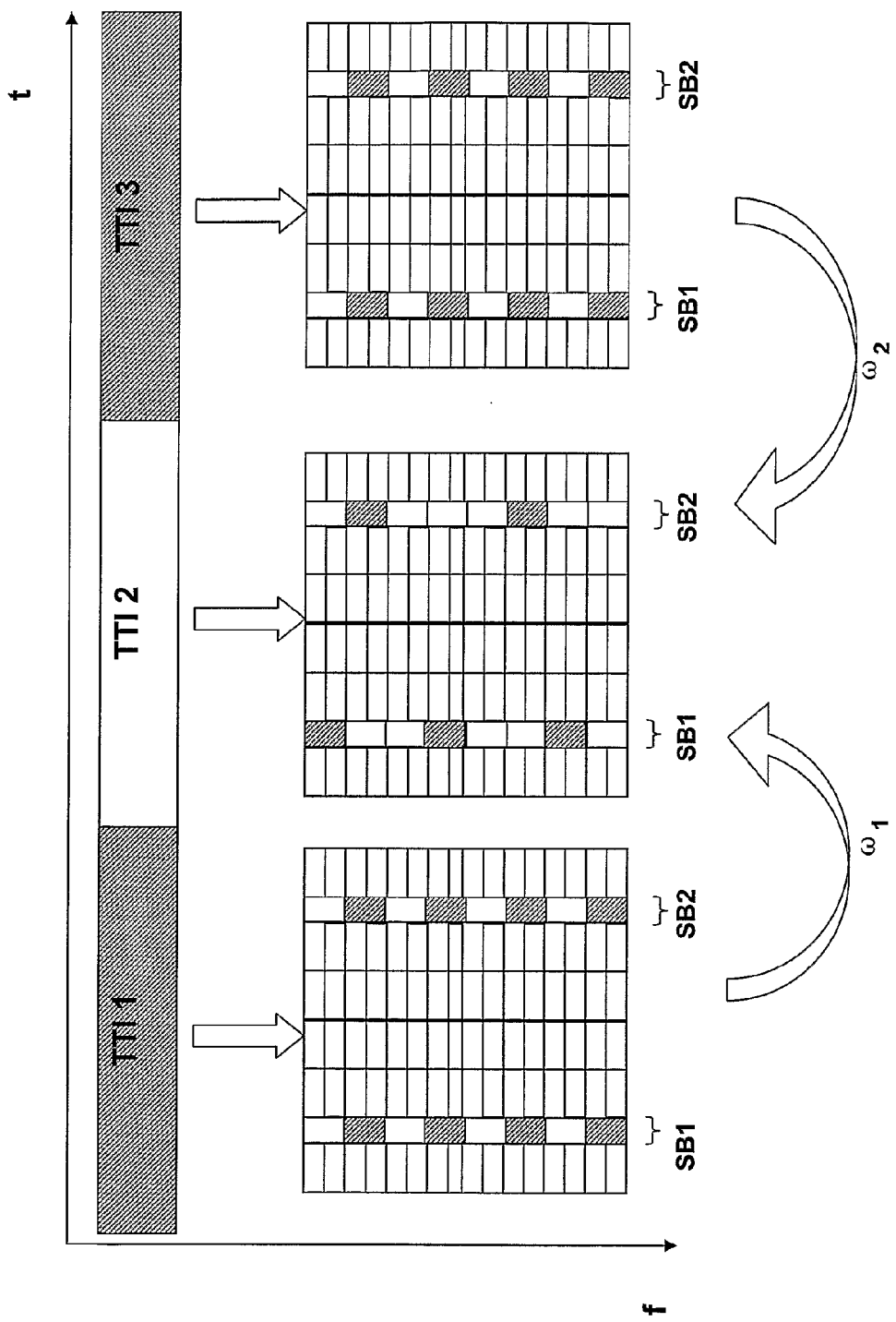
FIG. 7 is a block diagram for a TTI grouping with lightly loaded reference signals according to an embodiment of the invention.

The embodiments described above completely eliminate the reference signals in some TTIs in a group. However, the embodiments can also be applied to groupings in which the reference signal overhead in the intermediate TTIs is lower, but not zero, as shown in FIG. 7.

Figure 8:
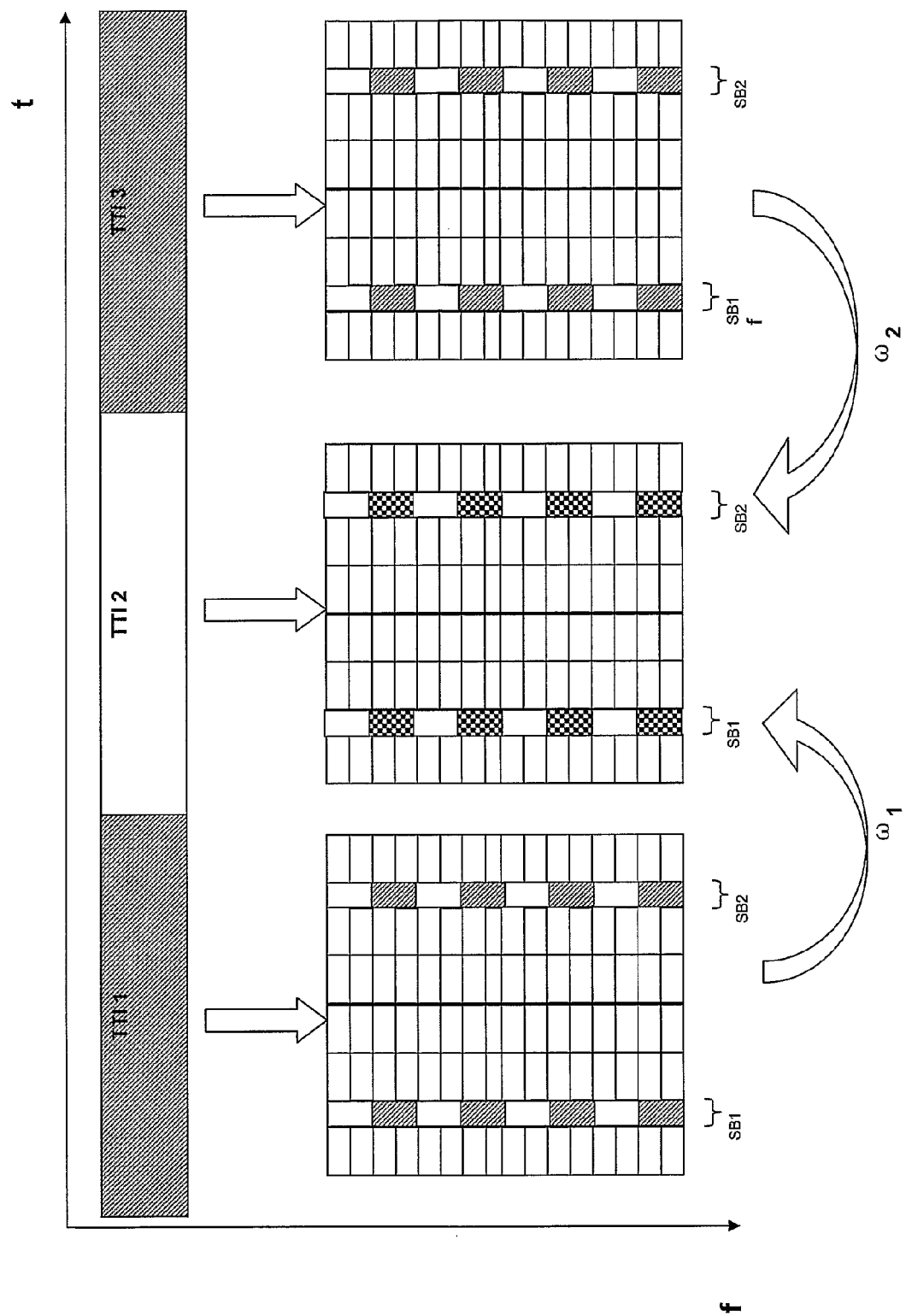
FIG. 8 is a block diagram for TTI grouping with reduced power reference signals according to an embodiment of the invention.

The TTI grouping schemes are equally applicable to CDM reference signals. In case of CDM, a lower reference signal overhead is achieved by means of selective power allocation, which allocates less power, or even no power to some of the reference signals in a group as shown in FIG. 8. In FIG. 8, the checkered short blocks include reference signals with reduced power.

Adapting TTI Grouping

In one embodiment of the invention, the number of TTIs that are grouped can be varied as a function of the speed of the UE. The speed of a UE can be determined by a UE speed estimator, for example, by measuring the Doppler spread and the knowledge of the carrier frequency. This can be done either at the mobile UE or the base station, as shown in FIG. 1D. This is based on our analysis of Table A.

In another embodiment, a density (power offset) of the reference signals in the TTI grouping in FDM or CDM is varied as a function of UE speed. The density of the reference signals can be reduced a greater amount for a slow moving or stationary UE.

In addition, a size of the groups can vary dynamically, e.g., depending on the speed or a scheduling load at the base station, measured in terms of a number of mobile transmitters to schedule or a number of resources to schedule each transmitter.

Staggered TTI Grouping

TTI grouping can also be used to improve the estimation accuracy without increasing the overhead.

Figure 9:
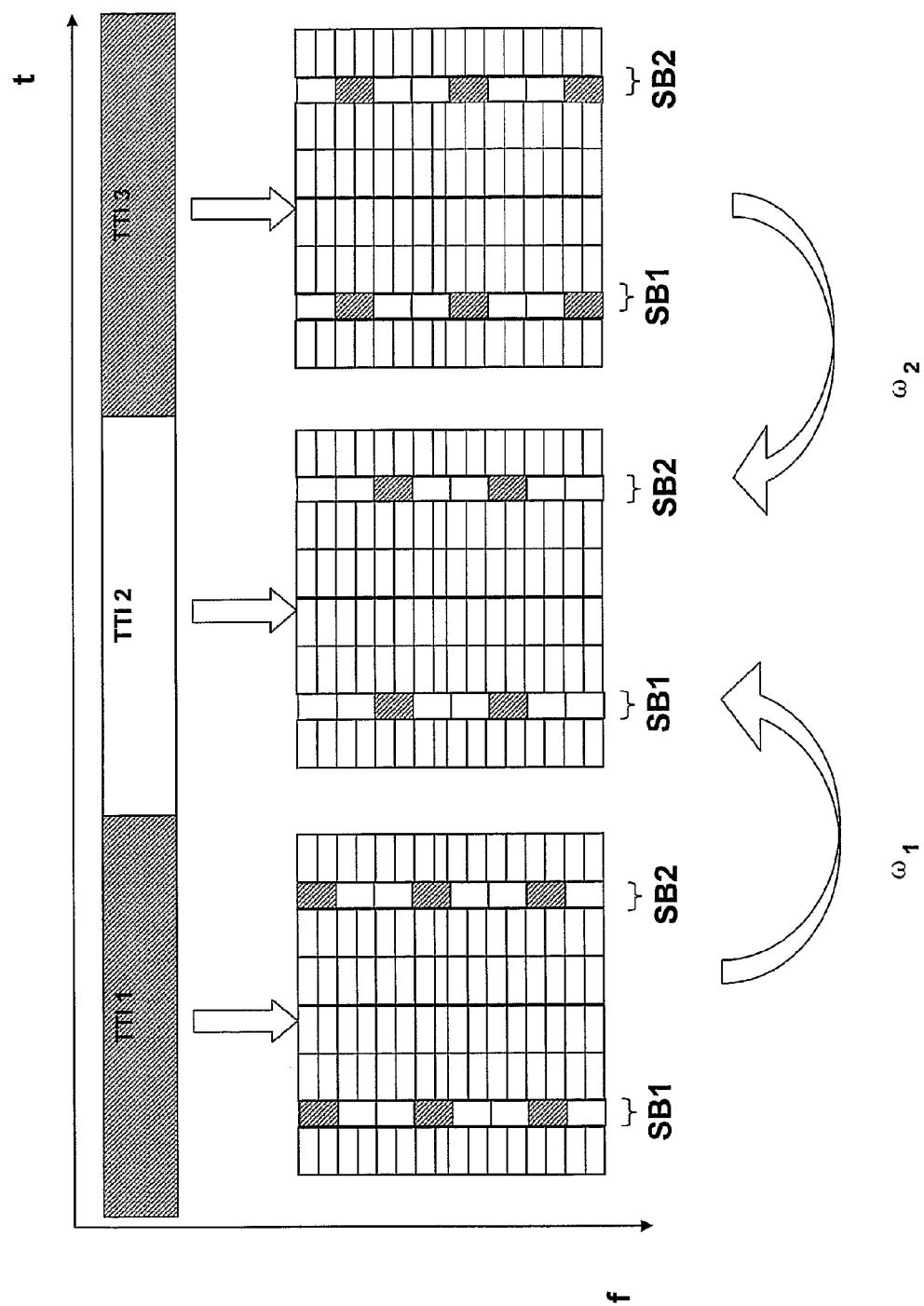
FIG. 9 is a block diagram of a staggered TTI grouping according to an embodiment of the invention.
Figure 10:
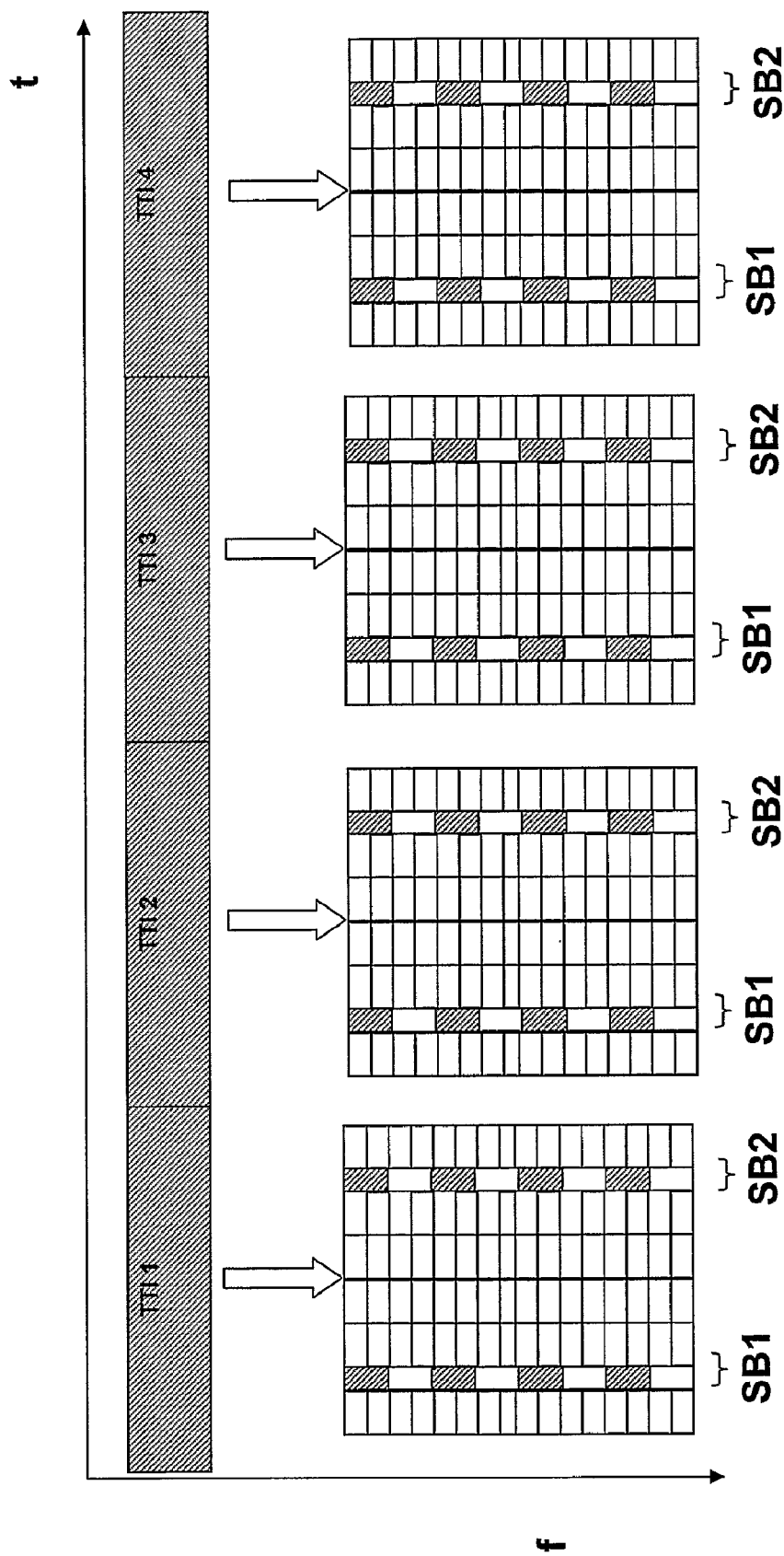
FIG. 10 is a block diagram of a reference signal pattern used in prior art.

This is shown in FIG. 9. In this figure, different sets of sub-carriers carry the reference signals in the different TTIs of the group.

Applicability of TTI Grouping in Variable TTI Configuration

In addition, the TTI grouping according to the embodiments of the invention can also be adapted to variable TTI. Variable TTIs are described in R1-060394, "Variable TTI for LTE," Motorola. There, variable length TTIs are defined as one or multiple sub-frames in which the sub-frame is the minimum transmission interval (0.5 ms). Variable TTI provides an alternate mechanism for transmission of data that avoids unnecessary layer 2 (L2) fragmentation to match the resources available in a sub-frame through re-definition of the transmission time interval as a variable attribute of the transport channel.

According to the embodiments of the invention, we generally use TTI as the minimum transmission interval, which is equal to the duration of a sub-frame. TTI grouping also helps reduce the number of higher layer protocol headers embedded in the lower protocol layer packet while still ensuring end-to-end functionality.

It is well known that for advanced encoding schemes, such as turbo codes, LDPC codes, etc., the forward error correction performance improves with a size of the frame. Thus variable TTI grouping improves throughput in two ways: a higher coding gain and a lower L2 overhead.

Estimation Procedures for TTI Grouping

We now describe linear estimation procedures that can be used to generate channel estimates of the channel for TTIs without reference signals. Linear estimation procedures for OFDM channels are generally described by Y. Li, N. Seshadri, and S. Ariyavisitakul, "Channel estimation for OFDM systems with transmitter diversity in mobile wireless channels," IEEE Journal on Selected Areas in Communication, vol. 17, no. 3, pp. 461-471, March 1999; and Y. Li, "Simplified channel estimation for OFDM systems with multiple transmit antennas," IEEE Trans. On Wireless Communications, vol. 1, no. 1, pp. 67-75, January 2002, both incorporated herein by reference.

When the reference signals are inserted in TTIs, two dimensional Wiener filter can be adapted. Let H denote the vector containing the CSI estimate of two TTIs $t_0$ and $t_1$:

$$\underline{H} = [H(t_0) H(t_0+jT)]^T,$$

where T is a duration of one TTI. The CSI at time $t_0+iT$ can be estimated by $$\hat{H}(t_0+iT) = \omega_1 H(t_0) + \omega_2 H(t_0+jT) = \underline{\omega}^T \underline{H}, \quad (3)$$

where $\omega = [\omega_1 \ \omega_2]^T$ is a complex weight vector. The weights $\omega$ can be determined so as to minimize an expected mean square error (MSE)

$$\min E\{\|\hat{H}(t_0+iT) - H(t_0+iT)\|^2\}. \quad (4)$$

A solution for an optimal $\underline{\omega} = [\omega_1 \ \omega_2]^T$ is given by the well known Wiener-Hopf equation $$\underline{\omega} = \underline{R}^{-1} \underline{Z},$$

where $\underline{R} = E\{\underline{H}\underline{H}^H\}$ and $\underline{Z} = E\{H(t_0+iT)^*\underline{H}\}$. The operator $(.)^H$ denotes a Hermitian transpose.

Other Applications of TTI Grouping the Proposed Method

The embodiments of the invention can be used in any OFDM based systems, such as systems implemented according to the IEEE 802.16 and 802.11 standards, in which the reference signal structure is used for channel estimation, for coherent demodulation/detection, and for channel quality estimation for frequency- and/or time-domain channel-dependent scheduling.

For example, the TTI grouping that exploits channel coherence can be extended to IEEE 802.16 systems by considering a group of OFDM symbols and/or frames.

Furthermore, the TTI grouping scheme can also be extended to channel quality indicator (CQI) measurements, and multi-input, multi-output (MIMO) systems for generating reference signals.

Although the embodiments have been described for signals in a 3GPP LTE system that uses a DFT matrix to spread a data stream over multiple sub-carriers allocated to UE, it should be understood that other spreading matrices as known in the art, such as a Hadamard matrix, or any unitary transformation, can be used.

EFFECT OF THE INVENTION

The embodiments of the invention reduce overhead associated with using reference signals on an uplink channel of a mobile communications network. The invention groups TTIs, and inserts reference signals with varying time, frequency, or power resources in the TTIs.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

The invention claimed is:

1. A method for processing reference signals for an uplink channel between a transmitter and a receiver in a wireless communications network, comprising the steps of:
   converting a sequence of symbols to be transmitted to a sequence of sub-frames;
   grouping the sequence of sub-frames into groups of sub-frames, each group of sub-frames including at least two time-adjacent sub-frames; and
   inserting reference signals in a subset of the sub-frames, wherein the receiver is located in a base station and the transmitter is located in a mobile user equipment, wherein, and wherein the steps are performed in the transmitter.

2. The method of claim 1, in which a size of each group varies dynamically.

3. The method of claim 2, in which the size depends on a speed of the transmitter.

4. The method of claim 2, in which the size is based on a scheduling load at the base station.

5. The method of claim 1, in which each sub-frame includes short blocks and long blocks, and each block is transmitted on a plurality of sub-carriers.

6. The method of claim 1, in which a particular group includes three time adjacent sub-frames, and the reference signals are inserted only in the first and last sub-frame.

7. The method of claim 1, further comprising:
   estimating channel state information for the subset of sub-frames; and
   interpolating, from the estimated channel state information, channel state information for any sub-frame not including reference signals.

8. The method of claim 1, further comprising:
   estimating channel state information for the subset of sub-frames; and
   predicting, from the estimated channel state information, channel state information for any sub-frame not including reference signals.

9. The method of claim 6, further comprising:
   estimating channel state information $\hat{H}_1$ and $\hat{H}_3$ for the first sub-frame and the third sub-frame; and
   interpolating channel state information for the second sub-frame according to $\hat{H}_2 = \omega_1 \hat{H}_1 + \omega_2 \hat{H}_3$, where $\omega_1$ and $\omega_2$ are interpolation coefficients.

10. The method of claim 9, in which the interpolation coefficients are determined using linear filter theory.

11. The method of claim 9, in which the interpolation coefficients are determined using maximum likelihood estimation.

12. The method of claim 9, in which the interpolation coefficients are determined using maximum a posteriori estimation.

13. The method of claim 1, in which a particular group includes two time adjacent sub-frames, and the reference signals are inserted only in the first sub-frame, and further comprising:
estimating channel state information $\hat{H}_1$ for the first sub-frame; and
predicting channel state information for the second sub-frame according to $\hat{H}_2=\omega\hat{H}_1$, where $\omega$ is a prediction coefficient determined by linear filter theory.

14. The method of claim 8, in which the prediction is forward.

15. The method of claim 8, in which the prediction is backward.

16. The method of claim 8, in which the prediction is forward and backward.

17. The method of claim 5, in which the receiver is allocated multiples of a minimum number of sub-carriers.

18. The method of claim 1, in which a reduced number of reference signals are inserted in the subset of the sub-frames.

19. The method of claim 1, in which the reference signals are code division multiplexed.

20. The method of claim 1, in which a subset of the reference signals have a reduced power.

21. The method of claim 1, in which the reference signal are frequency division multiplexed.

22. The method of claim 1, in which the wireless communications network uses a single carrier, frequency division multiple access signaling technique.

23. The method of claim 1, in which the reference signals are staggered over time and frequency over a plurality of sub-frames.

24. The method of claim 1, in which a size of the sub-frame is variable.

25. The method of claim 1, in which the receiver is a base station and further comprising:
signaling a manner of the grouping and the inserting by the base station.

26. The method of claim 1, in which the transmitter uses multiple antennas.

27. The method of claim 1, further comprising:
estimating a channel quality indicator from a subset of the reference signals.

28. The method of claim 1, in which the wireless communication systems uses SC-FDMA.

29. A transmitter for processing reference signals for an uplink channel to a receiver in a wireless communications network, comprising:
means for converting a sequence of symbols to be transmitted to a sequence of sub-frames;
means for grouping the sequence of sub-frames into groups of sub-frames, each group of sub-frames including at least two time-adjacent sub-frames; and
means for inserting reference signals in a subset of the sub-frames, in which the receiver is located in a base station and the transmitter is located in a mobile user equipment.

30. The transmitter of claim 29, in which the transmitter is mobile, and a number of sub-frames in each group depends on a speed of the transmitter.

31. The transmitter of claim 29, in which the transmitter is mobile, and a size of each group varies dynamically according to a speed of the transmitter.

32. The transmitter of claim 29, further comprising:
a receiver configured to estimate channel state information for the subset of sub-frames; and
means for interpolating channel state information for any sub-frame not including reference signals from the estimated channel state information.

33. The transmitter of claim 29, in which the transmitter is allocated multiples of a minimum number of sub-frames.

34. The transmitter of claim 29, in which a subset of the reference signals have a reduced power.

35. The transmitter of claim 29, in which the wireless communication systems uses a single carrier, frequency division multiple access signaling technique.

36. The transmitter of claim 29, in which the reference signals are staggered over time and frequency over a plurality of sub-frames.

37. The transmitter of claim 29, in which a size of the sub-frame is variable.

38. The transmitter of claim 29, in which the receiver is a base station and further comprising:
means for signaling a manner of the grouping and the inserting by the base station.

39. A wireless communications network, the wireless communications network including a transmitter and a receiver for processing reference signals on an uplink channel between the transmitter and the receiver, comprising:
means for converting a sequence of symbols to be transmitted to a sequence of sub-frames;
means for grouping the sequence of sub-frames into groups of sub-frames, each group of sub-frames including at least two time-adjacent sub-frames; and
means for inserting reference signals in a subset of the sub-frames, in which the receiver is located in a base station, and the transmitter is located in a mobile user equipment.

40. A method for processing reference signals for an uplink channel between a plurality of mobile user equipment and a base station in a wireless communications network, comprising, in each mobile equipment, the steps of:
converting a sequence of symbols to be transmitted to a sequence of sub-frames;
grouping the sequence of sub-frames into groups of sub-frames, each group of sub-frames including at least two time-adjacent sub-frames; and
inserting reference signals in a subset of the sub-frames, in which the receiver is located in a base station, and the transmitter is located in a mobile user equipment, wherein, and wherein the steps are performed in the transmitter.

41. The method of claim 40, in the plurality of user equipment are mobile, and a number of sub-frames in each group depend on a speed of each user equipment.

42. The method of claim 40, in which the user equipment is mobile, and a size of each group varies dynamically according to a speed of the user equipment.

43. The method of claim 40, further comprising:
estimating, in the base station for each user equipment, channel state information for the subset of sub-frames; and
interpolating, in the base station for each user equipment, channel state information for any sub-frame not including reference signals from the estimated channel state information.

44. The method of claim 40, further comprising:
estimating, in the base station for each user equipment, channel state information for the subset of sub-frames; and predicting, in the base station for each user equipment, channel state information for any sub-frame not including reference signals from the estimated channel state information.

45. The method of claim 40, in which a subset of the reference signals have a reduced power.

46. A method for reducing resources required for transmitting reference signals on an uplink channel between a transmitter and a receiver in a wireless communications network, comprising:

grouping a sequence of sub-frames to be transmitted, corresponding to a sequence of input symbols, into groups of sub-frames, each group of sub-frames including at least two time-adjacent sub-frames; and inserting reference signals in a subset of the sub-frames, wherein the receiver is located in a base station and the transmitter is located in a mobile user equipment, and the steps are performed in the transmitter.

* * * * *